United States Patent [19]
Sakamoto et al.

[11] Patent Number: 5,559,551
[45] Date of Patent: Sep. 24, 1996

[54] SUBJECT TRACKING APPARATUS

[75] Inventors: Takayuki Sakamoto; Taro Suito, both of Kanagawa, Japan

[73] Assignee: Sony Corporation, Tokyo, Japan

[21] Appl. No.: 450,022

[22] Filed: May 25, 1995

[30]     Foreign Application Priority Data

May 30, 1994   [JP]   Japan ................... 6-139475

[51] Int. Cl.[6] ................................. H04N 5/225
[52] U.S. Cl. .................... 348/169; 348/208; 348/407
[58] Field of Search .................... 348/169, 208, 348/407

[56]           References Cited

U.S. PATENT DOCUMENTS

| | | | |
|---|---|---|---|
| 5,187,574 | 2/1993 | Kosemura et al. | 348/169 |
| 5,196,688 | 3/1993 | Hesse et al. | 348/169 |
| 5,196,929 | 3/1993 | Miyasaka | 348/169 |
| 5,204,749 | 4/1993 | Toyama et al. | 348/169 |
| 5,214,504 | 5/1993 | Toriu et al. | 348/407 |
| 5,280,530 | 1/1994 | Trew et al. | 348/169 |
| 5,291,300 | 3/1994 | Ueda | 348/208 |
| 5,355,163 | 10/1994 | Tomitaka | 348/208 |

*Primary Examiner*—Tommy P. Chin
*Assistant Examiner*—Frank Snow
*Attorney, Agent, or Firm*—William S. Frommer; Alvin Sinderbrand

[57]           ABSTRACT

A subject tracking apparatus in which the target is tracked further stably by effectively eliminating the erroneous judgment due to the effects from the object which resembles the target, the luminance change, and objects having different shapes. Each of the R-Y signal and the B-Y signal at setting the feature of target is modeled by the luminance, so as to detect the features without concerning the hue to the luminance change. Also, the R-Y signal and the B-Y signal are directly modeled, so as to detect the features in the same way regarding the subject with colorless since hue has no effect on it. Since it becomes unnecessary to adjust the parameter strictly by modeling in regard to the permissible error, the target can be tracked stably even the luminance changes.

8 Claims, 14 Drawing Sheets

\* ······ POSITION TO BE Lmin
IN EACH COLUMN

SUBJECT TRACKING APPARATUS

BACKGROUND OF THE INVENTION

1. Field of the Invention

This invention relates to a subject tracking apparatus, and more particularly, is applicable to a system in which a subject can be automatically photographed in a camera with VTR, a camera for business, a television conference system, a videophone, a security system, and the like.

Further, this invention is applicable to a camera for photographing a subject in the best condition by controlling auto-iris or auto-zoom in a camera in accordance with the information of the subject.

Also, this invention is applicable to an automatic editing system for taking out only a scene of which a subject is photographed, and enables efficient cording which gives much information to a subject.

2. Description of the Related Art

Heretofore, there have been many kinds of systems which track a subject from the sensor information other than a camera (image).

In the above systems, a subject tracking apparatus has been proposed, in which a subject to which a signal transmitter of infrared rays or supersonic waves is attached, and the signal is received at a sensor to detect the direction from the change of level of received signal or phase difference. As a method that a special signal transmitter is not needed, a subject tracking apparatus has been proposed, in which a combination of voice and stereo microphone, pyroelectric sensor, and the like are used so as to detect the direction from the received signal of sensor similar to the above method.

Also, as a system for tracking a subject based on the color video signal, for example, the following four relating application have been proposed by the same applicant: U.S. Pat. No. 5,355,163; European Patent Laid Open No. 0561593 (Published Date: Sep. 22, 1993); European Patent Laid Open No. 0578508 (Published Date: Jan. 23, 1994); and European Patent Laid Open No. 0634665 (Published Date: Jan. 18, 1995). (In addition, the U.S. Patent Applications corresponding to three European Patent Laid Open Numbers are now in pending. Each of the above applications is owned by the assignee of the present invention and is hereby incorporated by reference.)

Heretofore, in such type of the subject tracking apparatus, the movement of a target object in the picture photographed by the television camera is detected so as to realize the automatic tracking in the photographed direction. Block matching is commonly used in the detection of the movement. Here, block matching is the method for detecting the block of which the correlation with the original block defined by the surroundings of the target or the characteristic part of the picture becomes maximum among the photographed pictures, and for detecting the position of block where the absolute value sum of the difference of pixels between the original block and that block becomes minimum as the the position of the target.

However, in the subject tracking apparatus using the block matching method, the target position is determined depending on the information of shapes contained in the original block. Therefore, it has been a problem that tracking becomes difficult in the case where the target changes its shape or its size. Moreover, since the processing to calculate the absolute value of difference of pixels between the original block and the block in the image requires numerous calculation works, it has been a problem that the circuit construction becomes complicated and it is difficult to realize by means of micro-computer.

Hence, a subject tracking apparatus to track the target by using the information having color video signal has been proposed (Japanese Patent Application No. 61060/1993).

The subject tracking apparatus tracks the object regarding the area as the target, the area being adjacent to the area detected the last time, i.e., time continuity of image obtained by integrating color image in the horizontal direction and the vertical direction respectively based on the fixed color making this color as the feature quantity.

Similarly, another subject tracking apparatus to track the object by using color video signal has been proposed (Japanese Patent Application No. 261678/1993).

The subject tracking apparatus comprises means for modeling the color of target from the color difference of the target (that is, R-Y signal and B-Y signal) by the linear function, and means for modeling the luminance Y and the saturation S of the target by the linear function. The estimated coefficient obtained from two means is feature quantity.

In the subject tracking apparatus, an evaluation function in the horizontal/vertical directions is respectively made from the difference between the data to be calculated from the estimated coefficient and the actual data, and the target tracking is conducted depending on this evaluation function.

However, in case of the subject tracking apparatus, since the color of the target is approximated by the linear function, the model error becomes bigger in accordance with the deviation of hue due to the luminance change and it becomes difficult to detect the feature quantity.

Hence, as an subject tracking apparatus has been proposed, in which means for modeling the luminance Y and the saturation S of the target by the linear function is replaced to means for modeling them by the quadratic function. The apparatus can heighten the modeling efficiency of the target color as compared with the above method and can improve the tracking ability of the target.

However, in this case, the color setting is so strict that the identification of the target may become difficult. Thereby, some error must be estimated with respect to model. Since it is difficult to set the quantity of error, there is a problem that the color of target can not be distinguished from the color of background if much quantity of error is estimated. Moreover, the target having colorless can not be distinguished.

SUMMARY OF THE INVENTION

In view of the foregoing, an object of this invention is to provide a subject tracking apparatus which is capable of tracking the target with remarkably high efficiency without the effects due to the movement of the target object such as the luminance change.

The foregoing object and other objects of the invention have been achieved by the provision of a subject tracking apparatus. By a color estimation function determining means, the hue of the target is judged from a first and second color difference signal contained in the target area among the input color video signal, and the first and second color difference signal are modeled by the color estimation function having the luminance as a variable, in accordance with the hue.

Further, by a permissible error model determining means, the permissible error model is calculated with respect to each of the first color estimation function corresponding to the first color difference signal and the second color estimation function corresponding to the second color difference signal, and the areas suitable to the permissible error mode is extracted by comparing the permissible error model to the input color video signal.

Then, a position is determined as the position where the target exists, the position where the correlation between the reference feature plane obtained as the picture element value of these area and the feature plane obtained with respect to the input color video signal input after setting the reference feature plane becomes maximum.

At the time when setting the target feature, the first and second color difference signal that the target is photographed are respectively modeled by the color estimation function of which variable is the luminance, so that the feature can be obtained without the effects from the change of hue with respect to the change of luminance.

Further, the first and second color difference signal are directly modeled, so that the target object can be detected without concerning the hue. Therefore, the feature of colorless target can be obtained.

Furthermore, the permissible error model is set with respect to the first and second color difference signal, so that it is not necessary to strictly adjust the parameter in setting the feature of target, and the stable tracking can be realized for the luminance change.

According to this invention, each of the first and second color difference signal by using the luminance signal in setting the feature of target, and the feature of target is obtained by using the permissible error model defined to the model, so that the subject tracking apparatus which can stably track the target without concerning the change of hue due to the luminance change.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

A subject tracking apparatus will be described here, the subject tracking apparatus which models each color signal obtained from the subject being the target, that is, R-Y signal and B-Y signal, into the quadratic function represented by the luminance Y respectively, and decides the permissible error range for the quadratic function as permissible error model, so that the subject can be surely distinguished from a screen.

(1—1) System construction

Figure 1:
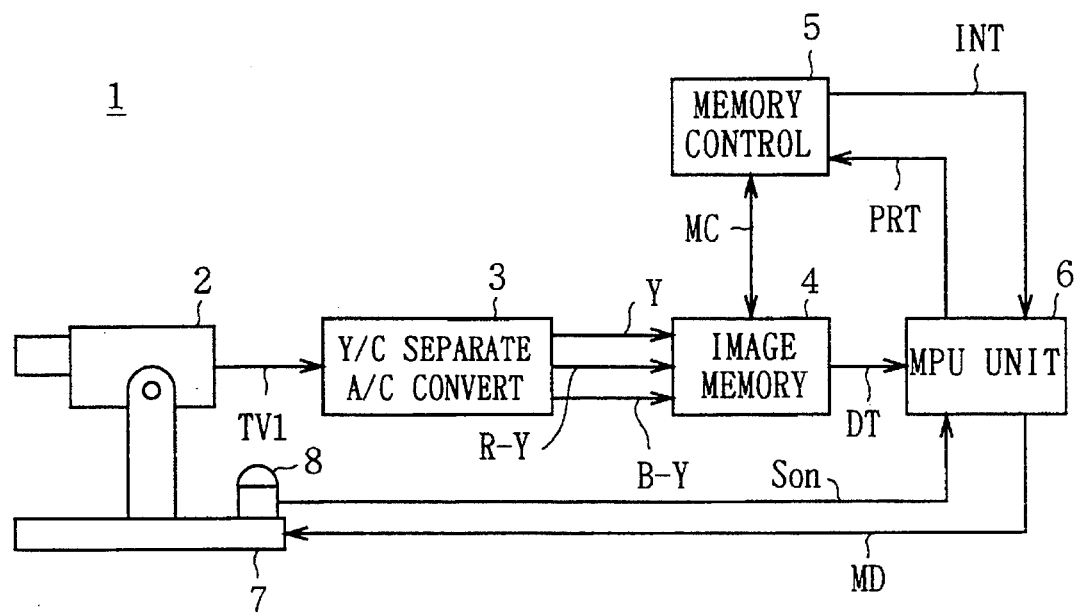
FIG. 1 is a block diagram showing the construction of one embodiment of the target tracking device.

FIG. 1 shows the system construction of a subject tracking apparatus 1. In the embodiment, the pixel value (Y, R-Y, B-Y) which are positioned at j-th in the horizontal direction and at i-th in the vertical direction on the image stored in a memory are represented by Yij,, Rij, and Bij.

An imaging device 2 are used for imaging a subject being a target, and is composed of a television camera, and the like. The color video signal TV1 of the subject photographed in the imaging device 2 is output to a Y/C separation and A/D conversion circuit 3.

The Y/C separation and A/D conversion circuit 3 Y/C separates the input color video signal TV1 into the luminance signal Y, R-Y signal and B-Y signal and A/D converts each signal independently to output them to an image memory 4.

The image memory 4 is used for storing the luminance signal Y, R-Y signal, and B-Y signal of the image which is sequentially imaged by the imaging device 2 and taken in, and suitably updates the image data based on the control of a memory control circuit 5.

The memory control circuit 5 controls the image memory 4 by memory control signal MC.

Here, when it is detected by the memory control signal MC that the image data has been written in the image memory 4, the memory control circuit 5 outputs interrupt signal INT to a microcomputer 6 (hereinafter, referred to as "MPU unit") to inform that image data in the image memory 4 is accessible.

Further, when it is detected by write protect signal PRT that the MPU unit 6 starts the processing of the image data which is taken in newly, the memory control circuit 5 prohibits the writing the image data in the image memory 4 by the memory control signal MC to protect data. On the contrary, when it is detected by the write protect signal PRT that the MPU unit 6 terminates the processing of the image data which has been taken in at present, the memory control circuit 5 releases the protection of image data in the image memory 4 by the memory control signal MC.

The MPU unit 6 takes in the feature quantity of the target from a setting screen based on the image data read from the image memory 4, and moreover, is a signal processing unit used for searching the target from all of screen which is imaged after taking in.

In the MPU unit 6, the setting processing of the target is performed when the setting starting signal Son, which is output when a switch 8 provided at a horizontal/vertical driving device 7 is pushed, is input, and the object positioned at the center of screen is detected as the target to extract the feature quantity.

Then, until the new target is set again, the MPU unit 6 continues to search the object which matches up to the feature quantity from the imaged picture taken from the imaging device 2, and operates to track the target.

Further, the MPU unit 6 outputs motor driving signal MD to the horizontal/vertical driving device 7 based on the moving direction and the moved amount of the target searched from the imaged picture, such that the target is constantly positioned at the center of the imaged screen, and moves the imaging direction of the imaging device 2 to the horizontal direction and the vertical direction.

(1-2) Target tracking processing

(1-2-1) Outline

Figure 2:
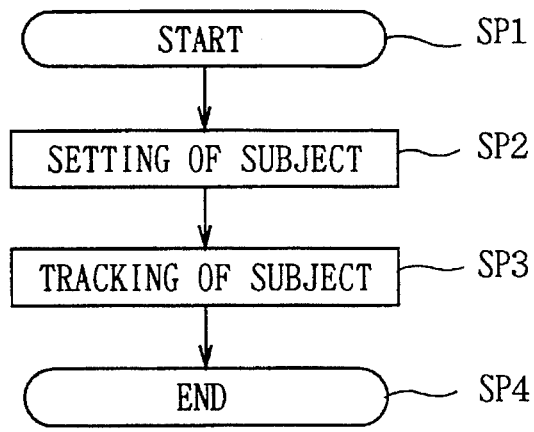
FIG. 2 is a flow chart showing the outline of the tracking procedure.
Figure 3:
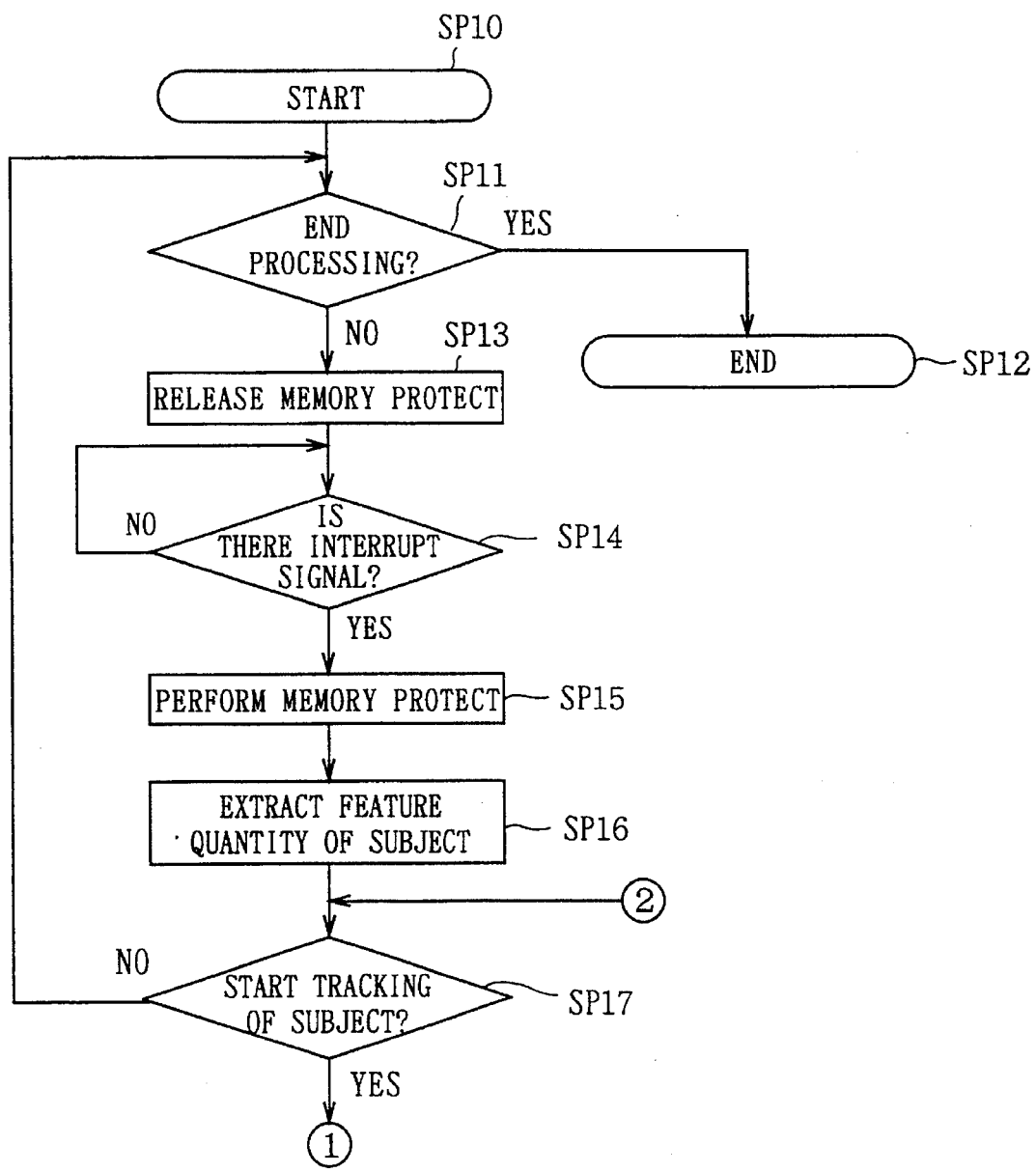
FIG. 3 is a flow chart showing the setting procedure of a subject according to a first embodiment.
Figure 4:
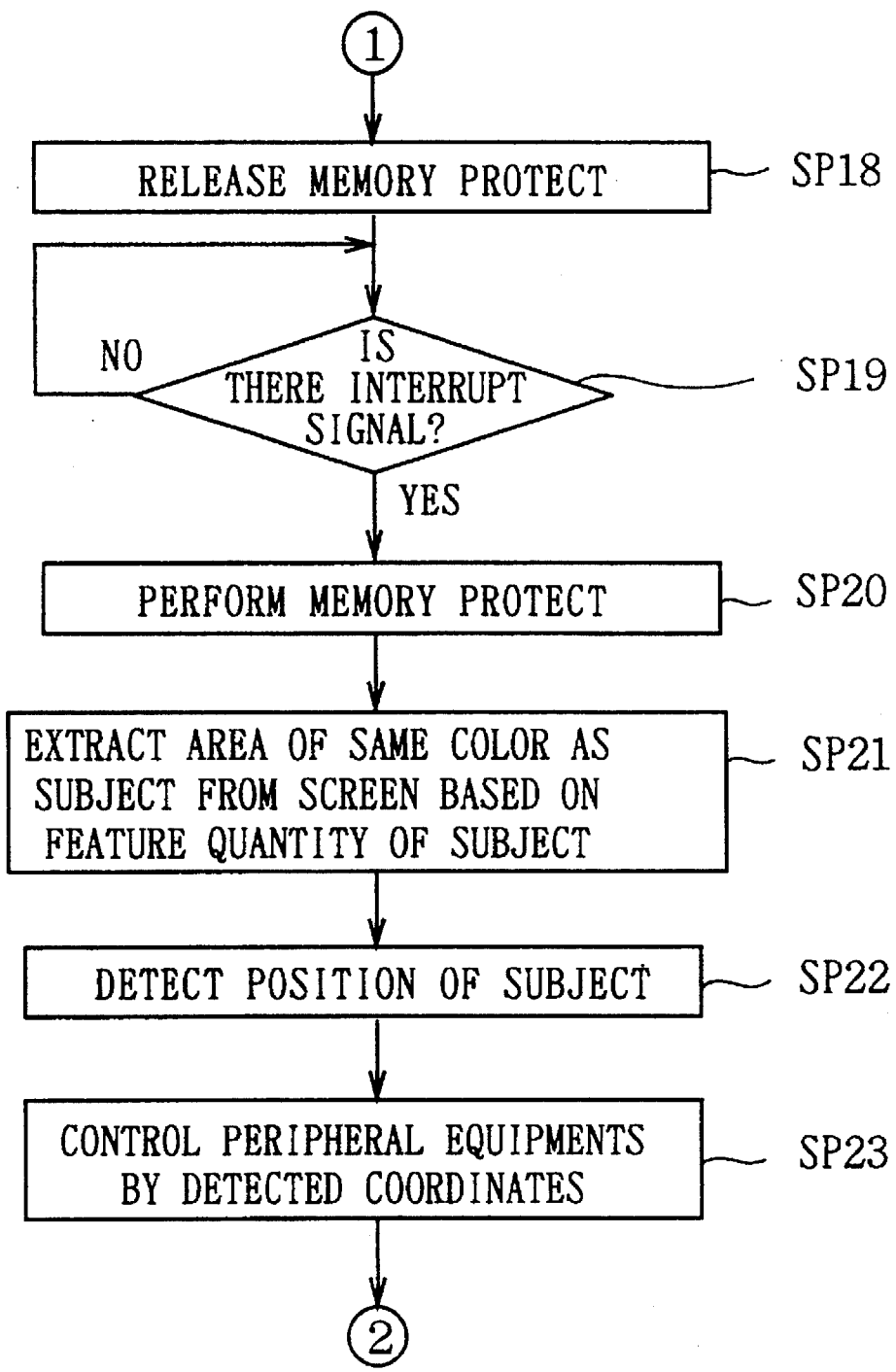
FIG. 4 is a flow chart showing the tracking procedure of a subject according to a first embodiment.

Next, the procedure performed in the MPU unit 6 will be described in detail. FIG. 2 shows the outline of the target tracking processing. The target tracking processing can be divided into two processing, the setting processing of a subject shown in step SP2 and the tracking processing of a subject shown in step SP3. FIGS. 3 and 4 show the procedure performed at steps SP2 and SP3 will be described in detail.

First, the outline of the setting procedure of a subject will be described using FIG. 3. The microprocessor in the MPU unit 6 starts the internal processing from step SP10, and at next step SP11, judges whether or not a sequence of processing operation is terminated. Here, if an affirmative result is obtained, the microprocessor in the MPU unit 6 proceeds to step SP12 to terminate the target tracking processing.

On the contrary, if negative result is obtained, the microprocessor proceeds to step SP13 to release the write protect of the image memory 4, and makes the image memory 4 to take in the picture imaged by the imaging device 2. Then, the microprocessor, at next step SP14, waits for interrupt signal INT inputting from the memory control circuit 5.

When the taking-in new imaged picture is terminated, the microprocessor of the MPU unit 6 proceeds to step SP15 to output write protect signal PRT to the memory control circuit 5, and instructs to maintain the content of memory.

Thereafter, the microprocessor proceeds to step SP16 to extract the feature quantity of a subject being the target. At the processing of step SP16, the microprocessor makes the quadratic function model with respect to the color signal extracted from the subject, and produces the permissible error model.

When the setting of the feature quantity is terminated, the microprocessor proceeds to step SP17 to judge whether or not the tracking of the subject is started. While the negative result is obtained, the microprocessor returns from step SP17 to step SP11, and repeats a sequence of operation.

If an affirmative result is obtained at step SP17, the microprocessor instructs to take new imaged picture in the image memory 4 at steps SP18, SP19, and SP20 in FIG. 4.

When new image data is stored in the image memory 4 by the processing, the microprocessor extracts from a screen the area having the same feature quantity as that of subject at step SP21.

The microprocessor proceeds to step SP22 to detect the position of the target from the extracted area.

Then, the microprocessor, at step SP23, controls the peripheral equipment based on the detected position. In this embodiment, the peripheral equipment is the horizontal/vertical driving device 7. Thereafter, the processing of the microprocessor returns to step SP17, and the processing is repeated until the termination of the subject tracking is instructed.

(1-2-2) Processing in each section

The outline of the target tracking processing is described above, and the procedure performed at the feature quantity extracting processing of subject SP16 and the position detecting processing of subject SP22 will be described in detail.

(1-2-2-1) the feature quantity extracting processing of subject

Figure 5:
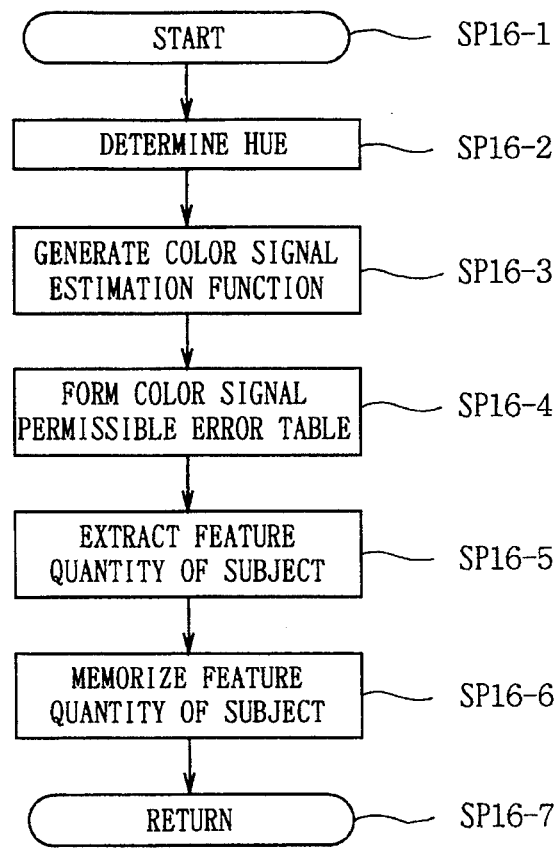
FIG. 5 is a flow chart snowing the feature quantity extraction procedure of a subject.

FIG. 5 shows the detailed procedure of step SP16.

First, the microprocessor starts the processing from step SP16-1. The microprocessor, at step SP16-2, determines hue of the area D in the center of the screen (e.g., 5×5 blocks) under the condition in which the subject is located in the center of the screen at first.

At this time, the microprocessor calculates the average values (Yave, Rave, Bave) from a set of pixels (Yij, Rij, Bij) in the area D, and determines *, which is equivalent to hue, by calculating the ratio of the average color signal Rave and Bave.

Further, at step SP16-2, the microprocessor reads out from a ROM the parameter necessary to approximate R-Y signal and B-Y signal by the quadratic function of which the variable is the luminance.

The parameters read at this time are the luminance value Rlo, Rhi where the value of R-Y signal is "0", the luminance value Blo, Bhi where the value of B-Y signal is "0", and the maximum value Rmax, Bmax and the minimum value Rmin, Bmin where the value of R-Y signal and B-Y signal can change. Here, the luminance value Rlo, Rhi is the end point of the quadratic function being the color signal estimation function.

Figure 6:
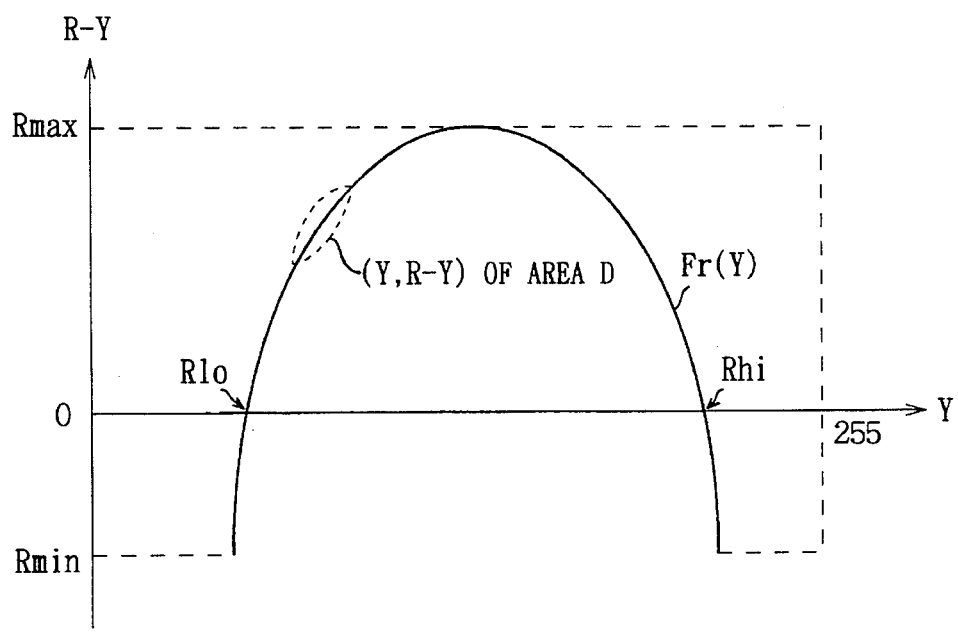
FIG. 6 is a schematic diagram explaining the color signal estimation function.

FIG. 6 shows an example of the color signal estimation function Fr(Y) for obtaining R-Y signal.

The microprocessor also performs the judgement of colorless at step SP16-2, and determines the end point in order that the quadratic function forms the shape as low-pitched curve as possible. The colorless is judged when both of the average value Rave and Bave are under the fixed value.

When the processing of step SP16-2 is terminated, the processing of microprocessor proceeds to step SP16-3. Here, on the basis of the parameter obtained at previous step SP16-2 and the pixels (Yij, Rij, Bij) of the area D, the coefficients a0, a1 of the quadratic function models Fr(Y) and Fb(Y) which are given by the equations:

$$Fr(Y)=A0\times(y-Rlo)\times(y-Rhi) \quad (1)$$

$$Fb(Y)=a1\times(y-Blo)\times(y-Bhi) \quad (2)$$

are obtained by the minimum square approximation. Thereby, the color estimation function Fr(Y) and Fb(Y) of R-Y signal and B-Y signal are determined.

Figure 7:
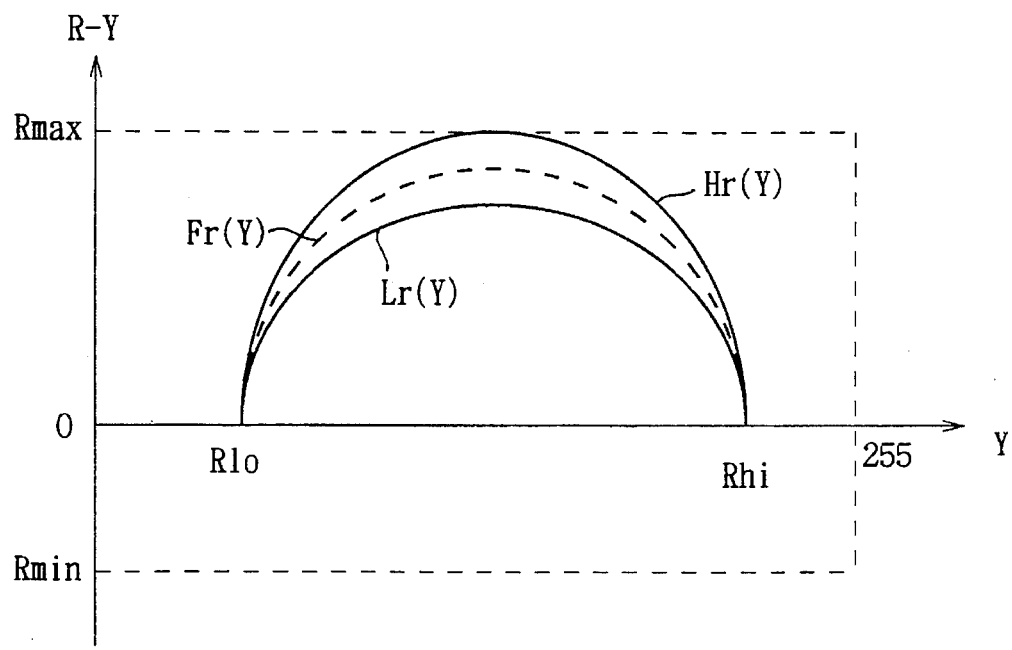
FIG. 7 is a schematic diagram explaining the permissible error table.

When the color estimation function Fr(Y) and Fb(Y) of the subject are set, the processing of microprocessor proceeds to step SP16-4. At step SP16-4, the microprocessor makes the error table of the color signal permissible function. FIG. 7 shows the relation between the color signal permissible function and the error table.

The microprocessor assumes that error is included in the R-Y signal and B-Y signal of the area Dij, and calculates the highest limit error tables Hr(Y) and Hb(Y) and the lowest limit error tables Lr(Y) and Lb(Y) to determine the permissible error limits. Since the luminance Y is the integer value from "0" to "255", the time for calculating the equations (1) and (2) can be reduced every time if the error table is previously made.

Assuming that 10% error exists, the highest limit error table Hr(Y) and the lowest limit error Lr(y) are determined as follows: When the value of R-Y signal is positive value, the highest limit error table Hr(Y) is set by multiplying the coefficient a0 of the equation (1) by 1.1 and the lowest limit error table Lr(Y) is set by multiplying the coefficient a0 of the equation (1) by 0.9. When the value of R-Y signal is negative value, the highest limit error table Hr(Y) is set by multiplying the coefficient a0 of the equation (1) by 0.9 and the lowest limit error table Lr(Y) is set by multiplying the coefficient a0 of the equation (1) by 1.1.

The highest limit error table Hr(Y) and the lowest limit error table Lr(Y) of B-Y signal are also calculated in the same manner.

When the calculation of the color signal estimation function and the error table of the subject is terminated, the microprocessor proceeds to step SP16-3 to perform the feature quantity extraction processing of the subject. First, the microprocessor extracts points (i,j) which satisfy the relationship of the following equations:

$$Lr(Yij)<Rij<Hr(Yij) \quad (3)$$

$$Lb(Yij)<Bij<Hb(Yij) \quad (4)$$

concerning each point in the area D (Yij, Rij, Bij), and sets the feature quantity C(i,j) with respect to the extracted position (i,j).

Here, the feature quantity C(i,j) can be considered:

$$C(i,j)=|Rij-Fr(Yij)|+|Bij-Fb(Yij)| \quad (5)$$

$$C(i,j)=Yij \quad (6)$$

In this embodiment, the equation (6) is taken to be the feature quantity C(i,j); and the feature quantity C(i,j) of the position which has not been extracted is put as the value "0".

When the extraction processing of the feature quantity C(i,j) is terminated, the microprocessor proceeds to step SP16-6, and stores the luminance Y(i,j) of the position (i,j) which satisfy the equations (3) and (4) in the area D as the reference feature quantity R(i,j). At this time, the stored reference feature quantity R(i,j) becomes a reference block for block matching in the position detection of the subject described later.

(1-2-2-2) Position detection processing of subject

Figure 8:
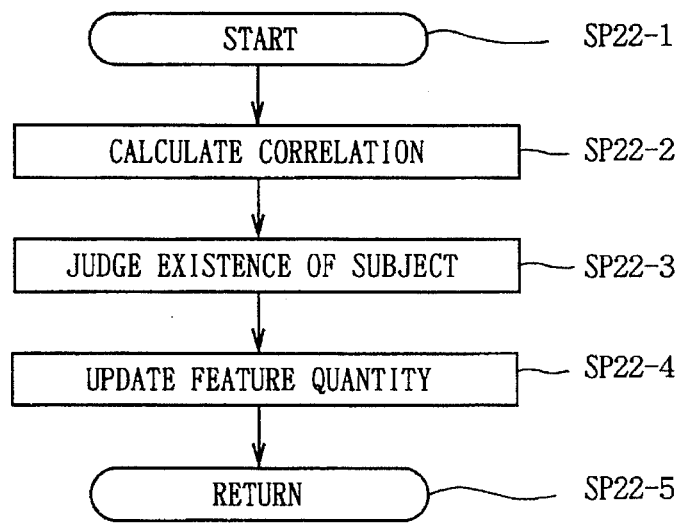
FIG. 8 is a flow chart showing the position detecting procedure of a subject.

Next, the tracking procedure of a subject performed at step SP22 will be described in detail with reference to FIG. 8.

The microprocessor, at previous step SP21, obtains the position (i,j) which satisfy the equations (3) and (4) by the same process as step SP16-5, and sets the feature plane PC(i,j) regarding the feature quantity C(i,j) at the position (i,j) as the luminance Y(i,j).

The microprocessor proceeds to step SP22-2 to calculate the correlation value MSij between the feature plane PC(i,j) and the reference feature quantity R(i,j) based on the equation:

$$MSij = \sum_{k=0}^{5} \sum_{l=0}^{5} |R(k, l) - C(i-2+k, j-2+l)| \quad (7)$$

In the equation, the position having the highest correlation can be obtained as the minimum value MSij. In this way, the processing that the reference feature quantity R(i,j) is shifted in the feature plane PC(i,j) to calculate the correlation value MSij at each point is the block matching.

After the block matching, the microprocessor obtains the minimum value MSmin of the correlation value MSij and the position (xmin, ymin) which can obtain the value, and then proceeds to next step SP22-3.

The microprocessor proceeds to step SP22-3 to compare the correlation value MSij with the threshold value THMS which is set previously, in order to judge whether the image obtained as the image having the highest correlation is effective as the target or not.

At this time, if the correlation value MSij is under the threshold value THMS, the detected position (xmin, ymin) is regarded as the position of subject, and a existing/non-existing flag is set to "1".

On the contrary, if the correlation value MSij is above the threshold value THMS, it is considered that the detected position (xmin, ymin) shows the same color area other than the subject, and the existing/non-existing flag is set to "0".

When the processing to judge the existence of the subject is terminated, the microprocessor proceeds to step SP22-4 to obtain the reference feature quantity R(i,j) with respect to the area having the position (xmin, ymin), which is detected only when the existing/non-existing flag is "1", being centered, and stores the value in stead of the reference feature quantity R(i,j). Thereby, even when the change of shape due to the movement occurs, the processing can be performed.

The microprocessor controls the motor of the horizontal/vertical driving device 7 shown in FIG. 1 by the position calculated at these processing and the judged result of existing/non-existing of the target, and moves the photographing direction of the imaging device 2 to automatically track the subject so that the subject being target is always within the screen.

(1-3) Effects

According to the foregoing construction, each color signal of the subject, that is, R-Y signal and B-Y signal, is modeled to the quadratic function Fr(Y) and Fb(Y) represented by the luminance Y, and the permissible error limit of the quadratic function is defined as the permissible error model Hr(Y), Lr(Y) and Hb(Y), Lb(Y), so that the subject tracking apparatus which can surely track the subject having colorless can be realized.

Further, according to the above construction, the subject tracking apparatus can be realized, which can absorbs the change of the feature quantity C(i,j) due to the change of lighting condition and extracts the feature quantity correctly without the effects from the change of lighting.

Furthermore, the area on the feature plane PC(i,j) and the reference feature quantity R(i,j) are matching processed in block matching, so that the subject tracking apparatus can be realized, in which the information of shape is also utilized for identifying the subject and the error identification to the neighboring object having similar color information can be avoided.

(2) Second Embodiment

In this embodiment, in the tracking processing of a subject performed after the setting processing of a subject, the pixels in the vicinity of the area extracted from the screen based on the color signal estimation function and the permissible error model is evaluated again, and the area to be judged that it has the same color as the subject is expanded to proceed to block matching processing, so that the subject tracking apparatus, which can realize the stable tracking even when the error is evaluated strictly, will be described.

(2-1) Target tracking processing

Figure 9:
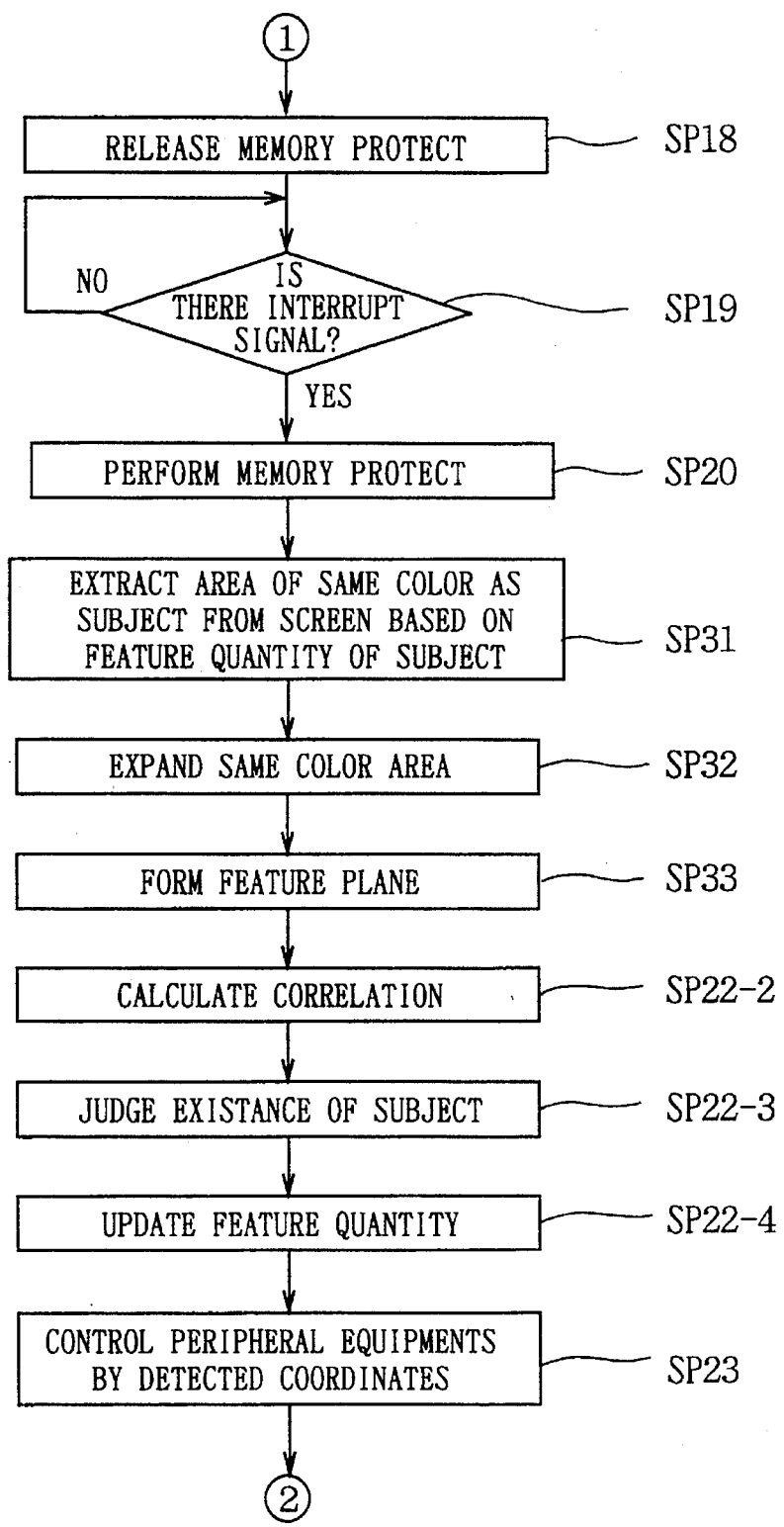
FIG. 9 is a flow chart showing the tracking procedure of a subject according to the second embodiment.

In the embodiment, since the setting processing of a subject is similar to the procedure of FIG. 3, only the tracking processing of the subject containing the processing differing from the first embodiment will be described. FIG. 9 shows the tracking processing of the subject in the embodiment. In FIG. 9, the portions corresponding to those in FIGS. 4 and 8 are designated with the same reference numerals. Therefore, steps SP31, SP32, and SP33 which are inserted between step SP20 and step SP22-2 are the peculiar processing in the embodiment. Hereinafter, the processing of steps SP31 to SP33 are described mainly.

The microprocessor, at step SP31, obtains the position (i,j) having the pixels which satisfy the equations (3) and (4) for a whole screen, and the feature quantity C(i,j) of the position (i,j) which satisfies two equations is set to "0" and the feature quantity C(i,j) of the position (i,j) which does not satisfy two equations is set to "1", so as to set the feature plane PC(i,j).

When the calculation processing of the feature plane PC(i,j) which has the whole screen as the area is terminated at step SP31, the microprocessor proceeds to step SP32 to evaluate again the color of the pixels in the vicinity of the area of which the feature quantity C(i,j) has been judged as "0".

For example, the color is evaluated with respect to the position where the feature quantity C(i,j−1) is "0" and the feature quantity C(i,j) is "1". The re-evaluation is performed by confirming whether or not the pixels Rij and Bij at the position (i,j) satisfy the equations:

$$|Rij - Rij-1| \leq Th \quad (8)$$

$$|Bij - Bij-1| \leq Th \quad (9)$$

regarding the previously set permissible value TH.

Here, if both of the equations (8) and (9) are satisfied, the microprocessor re-evaluates the feature quantity Cij of the position (i,j) to "0", and continues the same re-evaluation processing.

The re-evaluation processing described above is the reevaluation to the pixels from left to right in the horizontal direction. Similarly, the re-evaluation to the pixels from right to left, to the pixels from up to down in the vertical direction, and to the pixels from down to up are also performed sequentially.

After these processing in the four directions are terminated, the expanding processing of the area regarded as the same color as the subject is completed and the microprocessor proceeds to the processing of step SP33.

The microprocessor proceeds to step SP33 to allocate the luminance Yij to the position (i,j) where the feature quantity C(i,3) is "0", and the fixed value THY to the position (i,j) where the feature quantity C(i,j) is "1", so as to set the feature plane PC(i,j).

The fixed value THY is the value which is previously set, and has the meaning for signifying different color from the subject. For example, if the luminance Y is eight bits, the value of "256" or "0" is set as the fixed value THY.

The processing after this is similar to the case of the first embodiment, and the explanation is omitted.

(2-2) Effects

According to the above construction, the pixels in the vicinity of area extracted from the screen are re-evaluated based on the color signal estimation function and the permissible error mode, and the area to be judged that it has the same color as the subject is expanded to proceed to the block matching processing between the area and the reference feature quantity R(i,j), so that the subject tracking apparatus can be realized, which can track stably comparing to the conventional apparatus because the existence of subject can be confirmed even in the area which becomes out of the permissible error limits by strict error evaluation.

(3) Third Embodiment

In the embodiment, the subject tracking apparatus will be described, in which the area to be searched is limited to not a whole imaged screen but a part of specified area, so that the distinction between the subject and the object having similar color as the subject is improved.

(3-1) Target tracking processing

Figure 10:
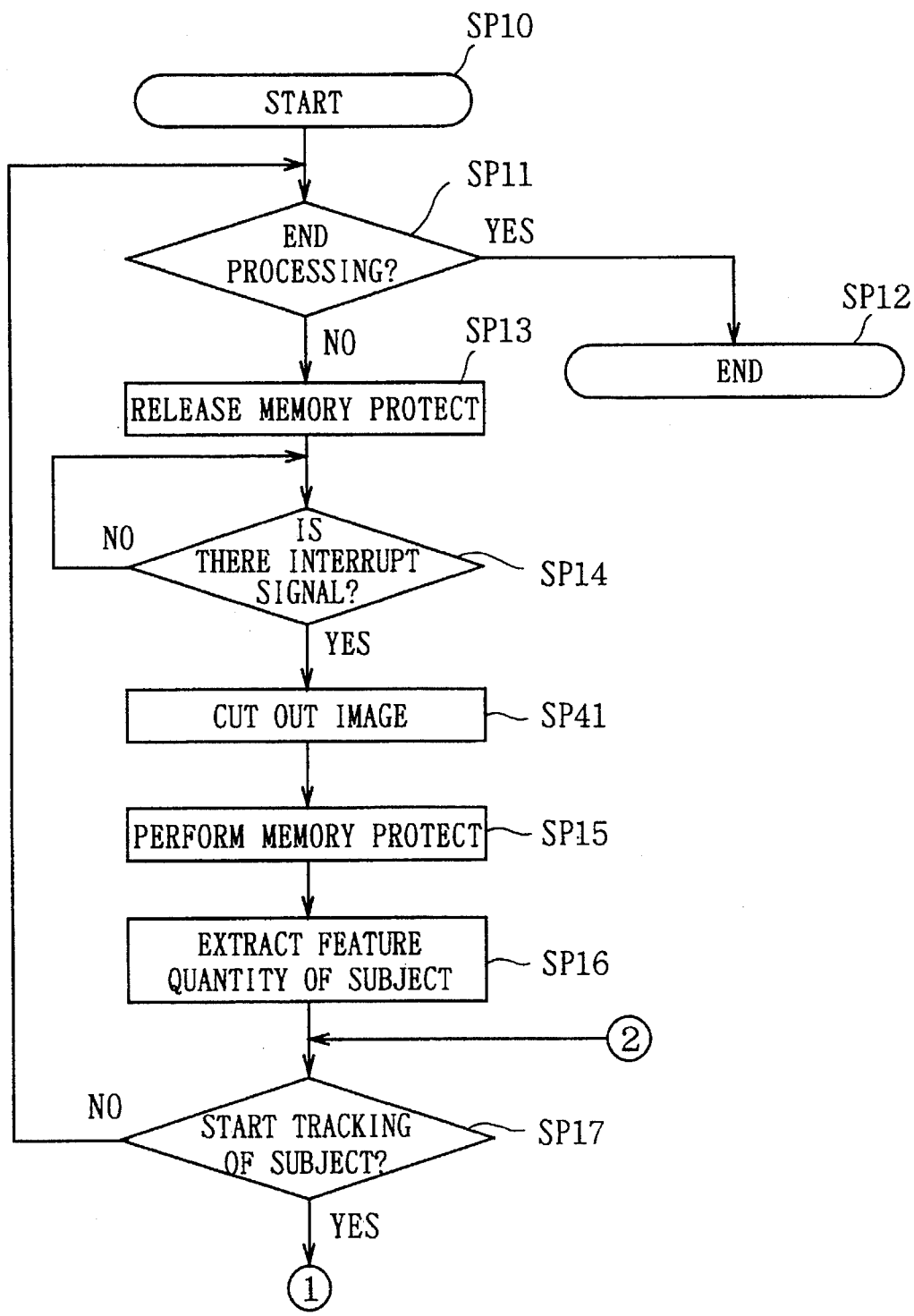
FIG. 10 is a flow chart showing the setting procedure of a subject according to the third embodiment.

FIG. 10, in which the portions corresponding to those of FIG. 3 are designated by the same reference numerals, shows the setting procedure of the subject used in the subject tracking apparatus according to this embodiment.

Figure 11:
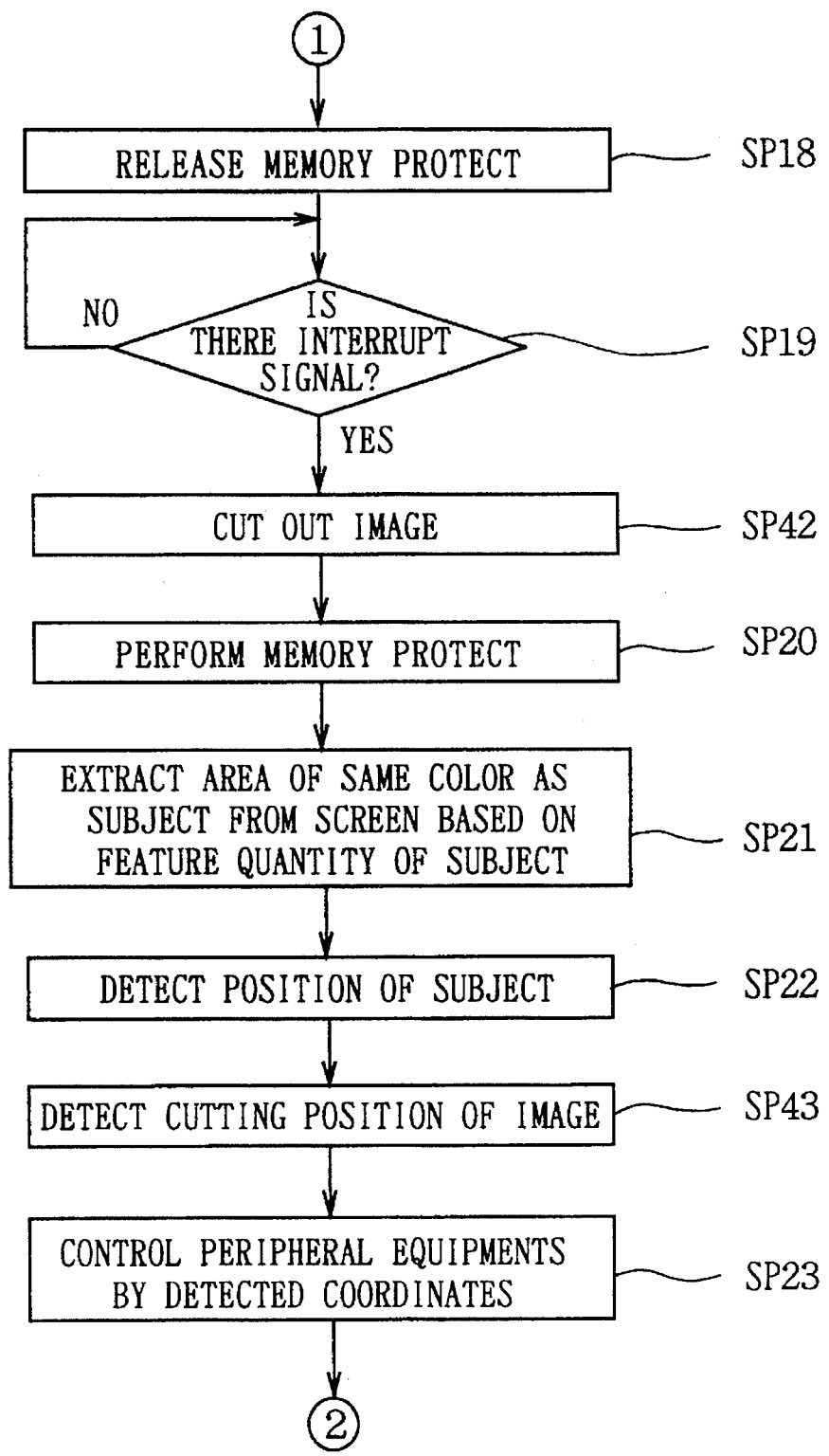
FIG. 11 is a flow chart showing the tracking procedure of a subject according to the third embodiment.

Further, FIG. 11, in which the portions corresponding to those of FIG. 4 are designated by the same reference numerals, shows the tracking procedure of the subject used in the subject tracking apparatus according to this embodiment.

It is obvious from FIGS. 10 and 11 that, the procedure of this embodiment is constituted by the same procedure as that of FIG. 3, excepting for the point that steps SP41 and SP42 to cut out the specified area from the whole screen are provided after step SP4 and SP19, and the point that step SP43 to reset the position where the specified area is cut out is provided after step SP22.

The processing of steps SF16, SP17 and steps SP21, SP22 are different from the case of FIG. 3 in the point that the only the specified area cut out from the whole screen is the target to be processed.

Figure 12:
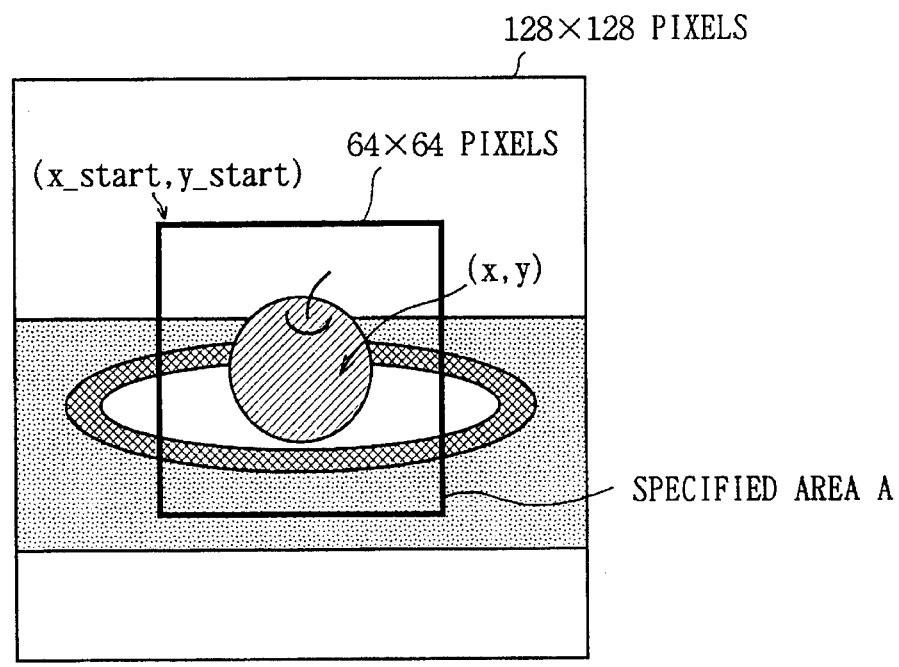
FIG. 12 is a schematic diagram showing the feature area cut out from a screen.

In this embodiment, as shown in FIG. 12, the size of whole screen is 128×128 pixels, and the size of area to be cut out as the specified area is 64×64 pixels.

First, at setting the subject, when the microprocessor of the MPU unit 6 detects the interrupt signal INT at step SP4 and detects that the image memory 4 is accessible, it proceeds to the processing of step SP41 to calculate the cutting starting position (x_start, y_start) regarding 64×64 pixels having the center position (x, y) of the screen being centered as the specified area A.

Thereafter,, the microprocessor proceeds to step SP15 to prohibit the writing of whole pixel data which are written in the image memory 4.

Further, the microprocessor proceeds to next step SP16 to perform the feature quantity extraction processing of the subject in which only the specified area A cut out is the target, and forms the color estimation function to specify the color of subject and the permissible error table to obtain the feature quantity C(i,j).

When the feature quantity C(i,j) of the subject is obtained, the microprocessor proceeds from step SP17 to step SP18 to start the tracking processing of the subject.

When it is detected that new image data have been taken at steps SP18 and SP19, the microprocessor which starts tracking calculates the cutting starting position (x_start, y_start) based on the specified position giving the specified area A by the processing shown in step SP42.

The specified position of the specified area A immediately after the tracking processing starts coincides with the center position of screen.

In this way, when the specified area A is determined, the microprocessor proceeds to the processing to extract the area having the same-color as the feature quantity C(i,j) of the subject from the specified area A, and obtains the feature plane PC(i,j) from the specified area A given by 64×64 pixels to detect the position of the subject.

When the position of the subject is detected at steps SP21 and SP22, the microprocessor proceeds to step SP43 to detect the cutting position of the specified area A used in the next processing.

Here, the microprocessor substitutes the position of the subject for the specified position to cut out the area having the obtained position being centered, in case that the subject exists within the specified area A, that is, the detected position is effective because effective/ineffective flag is "1".

On the contrary, in case that the subject does not exist within the specified area A, the microprocessor sequentially changes the cutting position of the specified area A until the subject is searched as shown in equation:

$$T0 \leq t \leq T1 \rightarrow (x, y) = (x0, y0)$$

$$T1 \leq t \leq T2 \rightarrow (x, y) = (x1, y1)$$

$$T2 \leq t \leq T3 \rightarrow (x, y) = (x2, y2)$$

$$T3 \leq t \leq T4 \rightarrow (x, y) = (x3, y3)$$

$$T4 \leq t \leq T5 \rightarrow (x, y) = (x4, y4) \quad (10)$$

Figure 13:
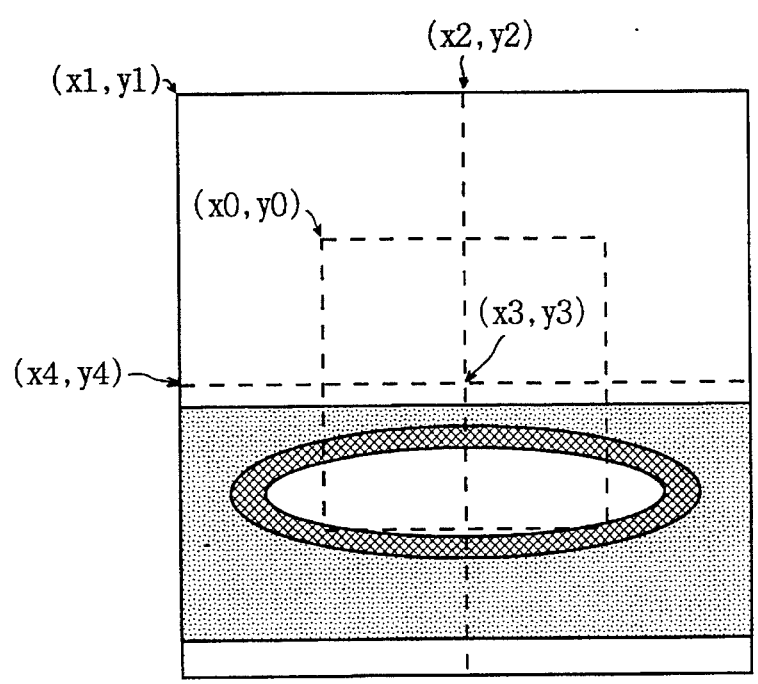
FIG. 13 is a schematic diagram showing the relation between the feature area and the cutting specifying position.

More specifically, when the effective/ineffective flag is "0" and the detected position is ineffective, the microprocessor successively changes the cutting starting position (x_start, y_start) from a point (x0, y0) to a point (x1, y1), (x2, y2), (x3, y3), and (x4, y4) in the image of 128×128 pixels, as shown in FIG. 13. At this time, the microprocessor successively changes the position in accordance with the number of times t when it is judged that the subject is ineffective. However, when the number of times t exceed T5, the number of times t is returned to "0" to resume the search operation from a point (x0, y0) again. In this way, in the subject tracking apparatus, the specified area A for detecting the subject is changed until the effective position is detected.

In this embodiment, even if the position of subject is calculated during the processing of step SP43, it is judged that the detected position is ineffective when the calculated position is the position where does not exist in time sequence, to continue the processing in accordance with the number of times.

On the contrary, it is judged that the detected position is effective when the position is detected in the same area sequentially, to use it in the next image cutting. Therefore, the reliability of the position of the subject detected by the judgement processing can be heighten.

(3-2) Effects

According to the above construction, in the setting of the subject and in the tracking processing from screen, the area used for searching the subject is limited within the specified area A which has the high possibility of the existence of subject, so that the subject tracking apparatus can be realized, which can improve the distinction of the subject even when the similar color with the subject are much contained in the color of background and the like, and can detect the subject from the screen with high efficiency.

Further, even when losing the sight of subject, the detecting processing of subject can be continued by successively changing the area on the screen cut out as the specified area A, and moreover, if the time sequence is not confirmed at the detected position of subject, the position is not detected as the effective position. Therefore, the subject tracking apparatus having high detection efficiency can be realized.

(4) Fourth Embodiment

The target tracking processing in the subject tracking apparatus for tracking the subject moving within the imaged plane has been described. However, in this embodiment, the subject tracking apparatus will be explained, which tracks such that the subject moving in the perspective direction by the zoom lens control of the imaging device 2 becomes almost constant in the size on the screen.

(4-1) System construction

Figure 14:
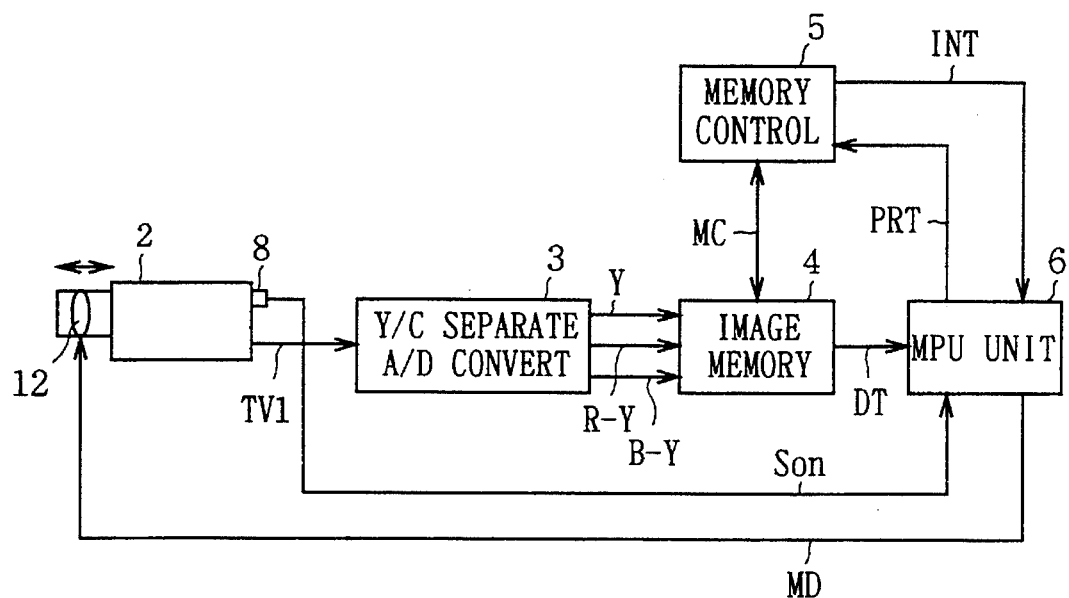
FIG. 14 is a block diagram showing one embodiment of the subject tracking apparatus.

The subject tracking apparatus 11 of FIG. 14, in which the portions corresponding to those of FIG. 1 are designated by the same reference numerals, has the same construction as that of FIG. 1, except for that the zoom lens 12 of the imaging device 2 is controlled by the control from the MPU unit 6.

This embodiment dose not comprise the horizontal/vertical driving device 7 which moves the photographing direction of the imaging device 2 to the horizontal direction and the vertical direction. However, this embodiment is also applicable to the system that the horizontal/vertical driving device 7 is added to the system of the embodiment.

Further, in this embodiment, the microprocessor of the MPU unit 6 calculates the area of the subject based on the feature plane PCij extracted from the imaged picture, and controls the zoom lens 12 in accordance with the calculated result.

Next, the procedure performed in the MPU unit 6 will be explained.

(4-2) Target tracking processing

In this embodiment, since the setting processing of the subject has the same procedure as that of FIG. 3 described in the first embodiment, only the tracking procedure of the subject will be explained.

Figure 15:
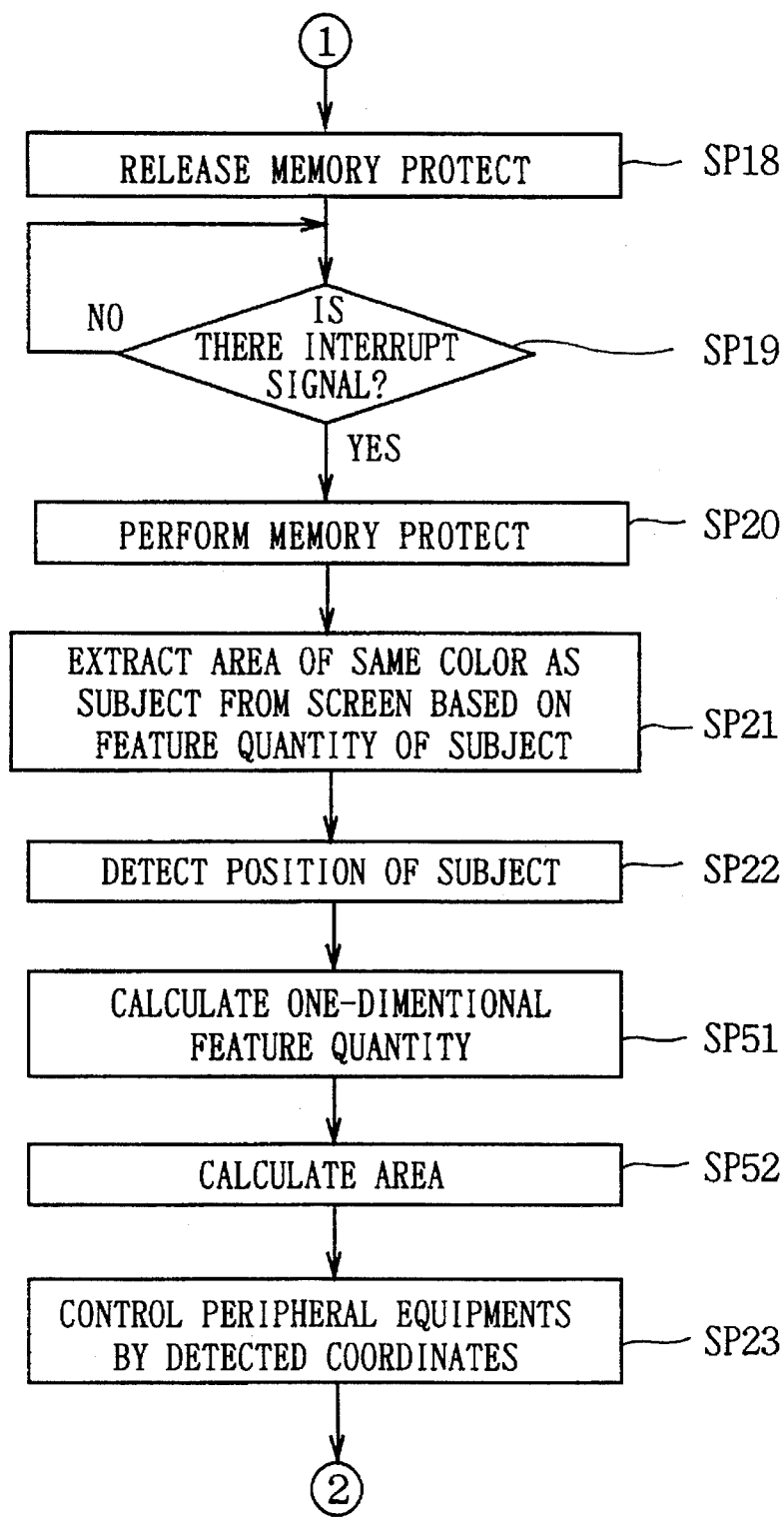
FIG. 15 is a flow chart showing the tracking procedure of a subject.

FIG. 15 shows the tracking procedure in this embodiment. In the procedure in FIG. 15, the portions corresponding to those of FIG. 4 are designated by the same reference numerals.

It is obvious from FIG. 15 that the procedure is constructed by the same procedure as that of FIG. 4 excepting that two processing are provided after step SP22 for detecting the position of the subject from the feature plane PCij obtained in the imaged picture.

Additional two processing are one-dimensional feature quantity inducing processing at step SP51 and area calculating processing at step SP52.

Here, step SP51 is the processing for obtaining the position of the subject calculated at previous step SP22 and the length from the feature plane PCij to the subject in the horizontal direction and the vertical direction. Step SP52 is the processing for obtaining the area from the length in the horizontal direction and the vertical direction.

Next, the concrete processing performed in two steps SP51 and SP52 will be explained by using FIGS. 16 and 17.

The microprocessor of the MPU unit 6 forms the color estimation function with respect to the color of the subject which is set by user, and calculates the feature plane PC(i,j), the existence of the subject, and the position (x, y) of the subject, by a sequence of processing to step SP22 similar to the embodiment described above.

In this condition, the microprocessor proceeds to step SP51 to generate a row of signal HORj obtained by making the feature quantity PC(i,j) to one-dimension in the vertical direction and a row of signal VERi obtained by making the feature quantity to one-dimension in the horizontal direction.

Figure 16:
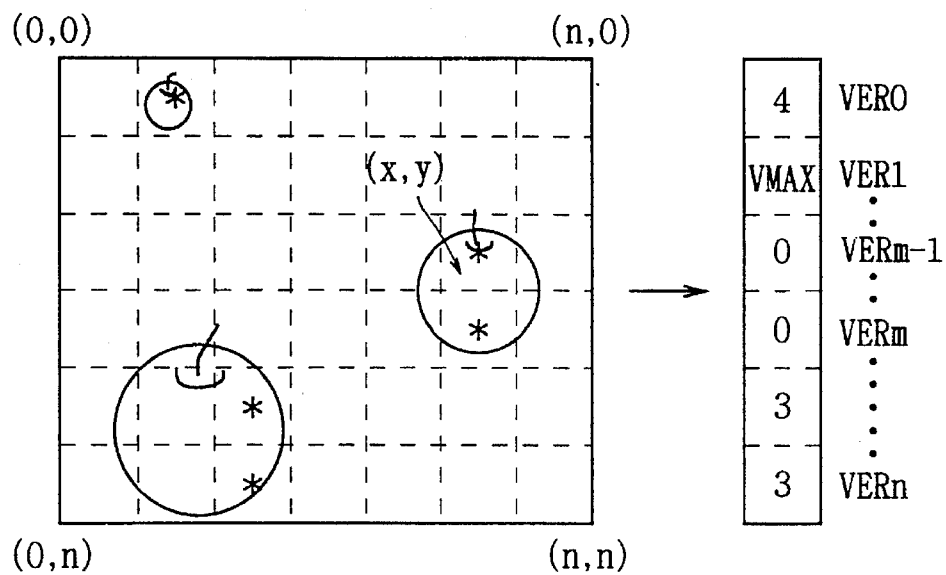
FIG. 16 is a schematic diagram showing an example of the construction of a row of linear signal.
Figure 17:
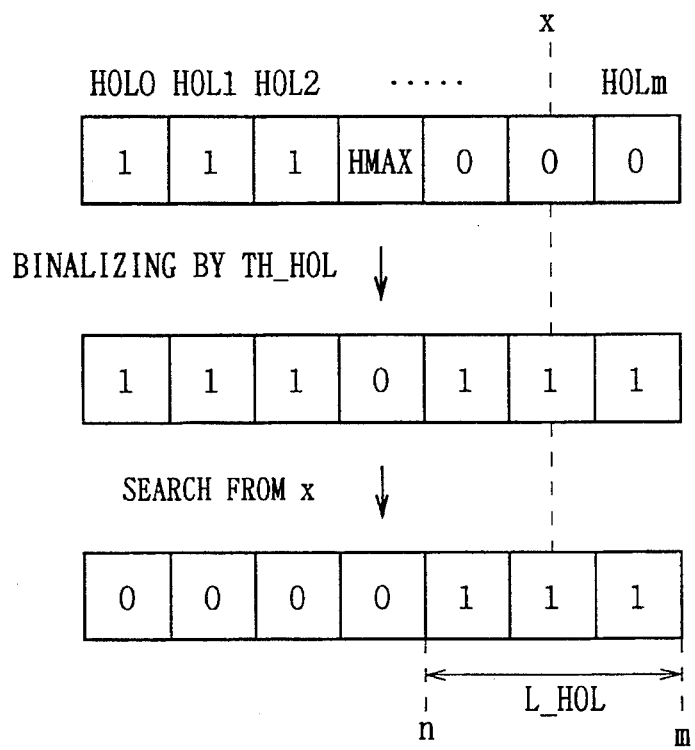
FIG. 17 is a schematic diagram showing an example of the distance calculation.

Here, FIG. 16 shows an example of the generation of a row of signal VERi. Further, a row of signal HORj also can be generated.

The predetermined values are written in a row of signal VERi in FIG. 16 respectively. These values are calculated by using the feature quantity C(k,j) in k-th on the feature plane C(i,j) as follows.

First, with respect to each point (k,j) of the feature quantity C(k,j) in k-th, the distance L between a point that is judged as the same color as the subject and the position (x,u) of the subject are obtained as L=|k−x|. Then, the minimum value Lmin of the distance to the position having the same color as the subject obtained on the row "k" is calculated as the value of VERk.

In FIG. 16, a medium sized fruit is the subject, and the distance L to the feature quantity C(k,j) of the fruit is "4". Thereby, the value of VER0 is calculated as "4".

If the same color as the subject does not exist in the row, the setting value VMAX is substituted so that non-existence of the color can be confirmed.

In the processing of step SP51, the same processing described above is performed with respect to a row of signal HORj.

When a row of signal VERi and HORj in the horizontal and vertical direction are respectively obtained, the microprocessor proceeds to the following step SP52 to calculate the length L_HOL and L_VER in the horizontal direction and the vertical direction of the subject, and proceeds to the processing for obtaining the area of the subject based on the product L_HOL×L VER.

The method for obtaining each length L_HOL and L_VER in the horizontal and vertical direction will be explained using FIG. 17. FIG. 17 shows an example of the distance L_HOL in the horizontal direction, and the distance L_VER in the vertical direction can be calculated similarly.

When the processing of step SP51 is terminated, the microprocessor searches the end points "m" and "n" by separating from the coordinates value "x" to right side and left side with respect to the previously detected position (x,y) of the subject.

For example, the end point "m" which is positioned in right side from the coordinates value "x" is obtained by searching the position of a row of signal HOLm which is more than the previously set threshold value TH_HOL.

Further, the end point "n" which is positioned in left side from the coordinates value "x" is also obtained by searching the position of a row of signal HOLm which is more than the previously set threshold value TH_HOL.

The difference between two positions thus obtained is the distance in the horizontal direction L_HOL=m−n. The distance in the vertical direction can also be calculated similarly, so that the area of the subject can be obtained from two length.

When the area setting processing of the subject at step SP52 is terminated, the microprocessor proceeds to step SP23 to proceed to compare the calculated area and the previously set area of the subject, so as to control the motor for moving the zoom lens 12 up and back. The area at the subject tracking setting and the area specified by all kinds of switches are used for the area of the subject.

The practical control is performed by determining the direction of which the zoom lens 12 is moved (a distant side or close side) by positive or negative of the difference dS between the calculated area and the set area, to determine the speed to move the zoom lens 12 by |dS|. The change of area by moving the zoom lens 12 has an effect on the next area extracting processing, and the zoom lens 12 is moved until the area becomes to the predetermined area.

(4-3) Effects

According to the above construction, R-Y signal and B-Y signal of the subject are modeled to the quadratic function Fr(Y) and Fb(Y) represented by the luminance Y respectively, the shape of the subject is detected from the feature plane PC(i,j) in which the permissible error limits for the quadratic function is obtained as the permissible error model Hr(Y), Lr(Y) and Hb(Y), Lb(Y), and the position of the zoom lens 12 is controlled based on the detected result. Therefore, the subject tracking apparatus which can zoom-photograph so that the area of the subject is always constant can be realized.

(5) Fifth Embodiment

In this embodiment, the subject tracking apparatus, which forms the frame in accordance with the size of the subject by using the area detection function of the subject which have been described in the previous embodiment, to display it on the subject of screen superimposingly.

(5-1) System construction

Figure 18:
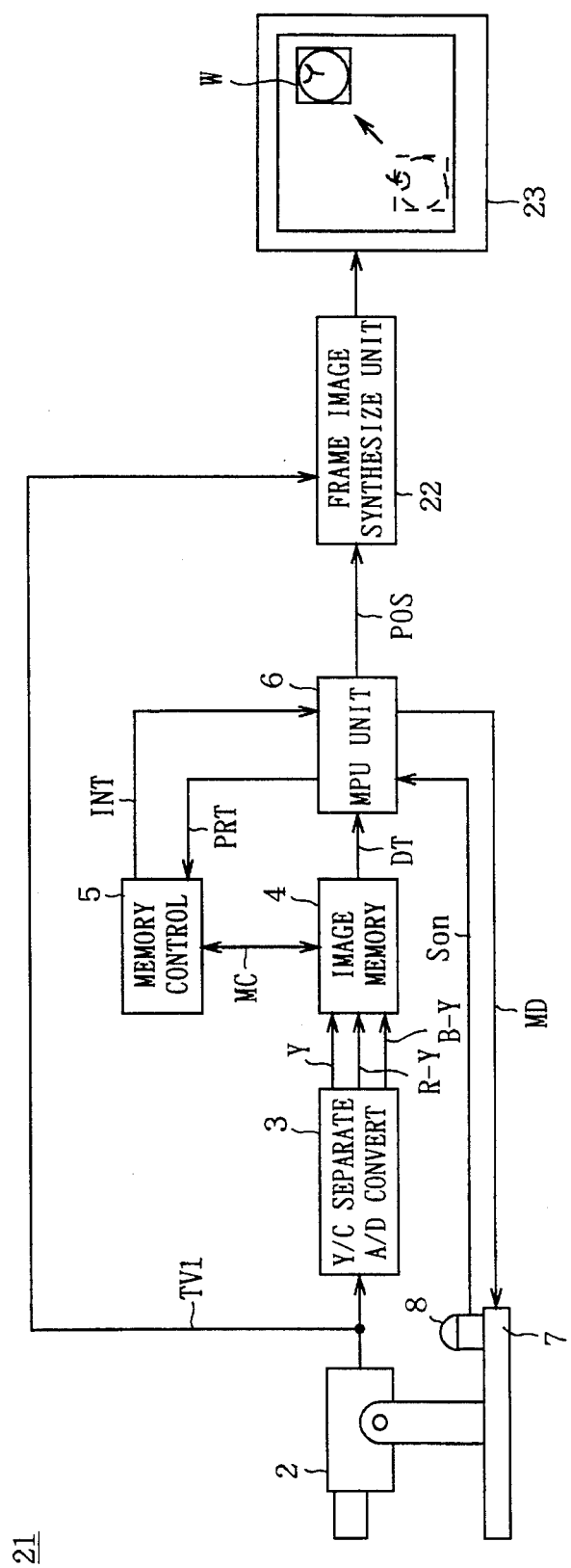
FIG. 18 is a block diagram showing one embodiment of the subject tracking apparatus.

FIG. 18, in which the portions corresponding to those of FIG. 1 are designated by the same reference numerals, shows the system construction of the subject tracking apparatus 21 which will be explained in this embodiment.

The subject tracking apparatus 21 has the same construction as that of FIG. 1, excepting that color video signal TV1 has the frame image synthesizing unit for displaying a frame W based on the position of the subject detected in the MPU unit 6 and the area information POS.

In this embodiment, the output of the frame image synthesizing unit 22 is displayed on the screen of the display unit 23.

(5-2) Target tracking processing and frame synthesizing processing

Figure 20:
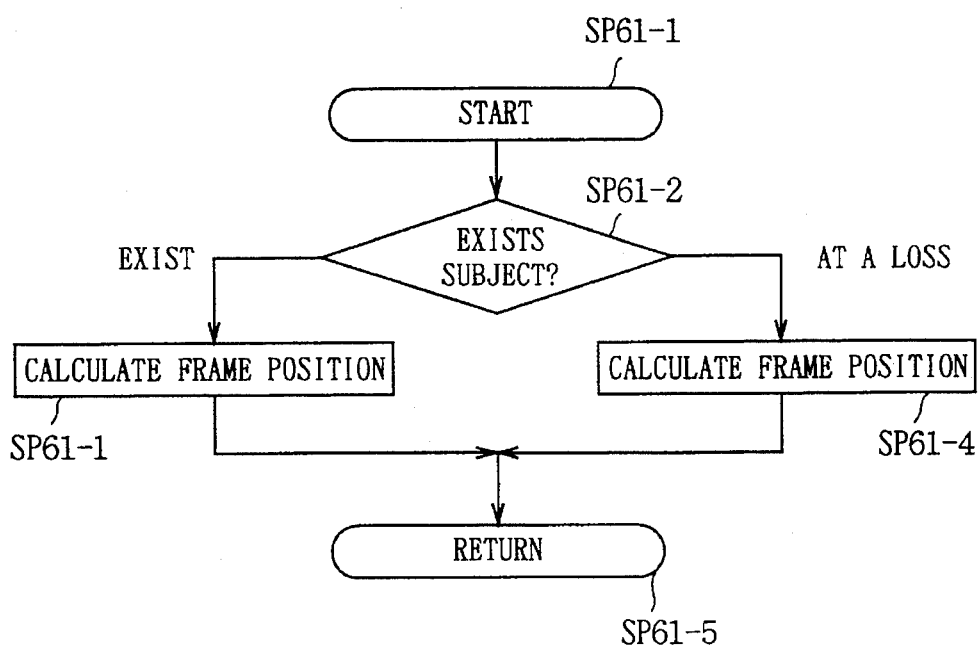
FIG. 20 is a flow chart showing the position calculation procedure of display frame.
Figure 19:
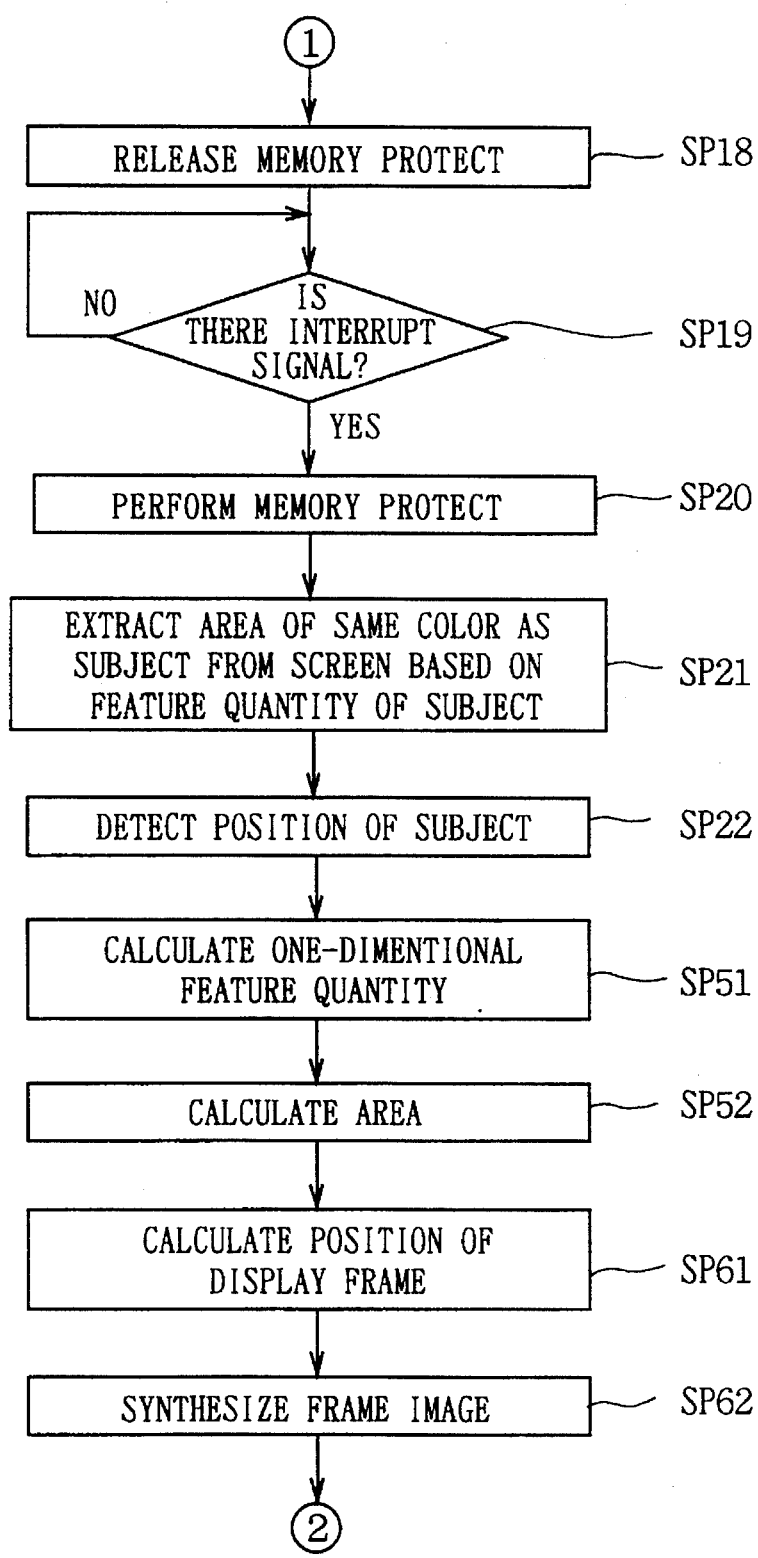
FIG. 19 is a flow chart showing the tracking procedure and the frame formation procedure of a subject.

In this embodiment, since the setting procedure of the subject performed in the MPU unit 6 is similar to the case of FIG. 3, only the tracking procedure and frame synthesizing procedure of the subject will be explained. FIGS. 19 and 20 show the tracking procedure according to this embodiment. In the procedure in FIG. 19, the portions corresponding to those of FIG. 15 are designated by the same reference numerals.

It is obvious from FIG. 19 that the procedure is similar to that of the fourth embodiment, excepting the processing after the area calculating processing shown in step SP52.

Therefore, only steps SP61 and SP62 will be described.

Step SP61 is the processing for calculating the position data of four corners of the frame W on the basis of the position of the subject detected up to the previous step, the existence of the subject, and the length in each direction.

FIG. 20 shows the content of step SP61. The microprocessor makes the processing diverge in accordance with the existence of the subject, and if the subject does not exist, proceeds from step SP16-2 to step SP16-3 to calculate the frame position.

Here, the microprocessor calculates the equation:

$$x0=x-L\_HOL/2,\ x1=x+L\_HOL/2 \quad (11)$$

regarding both of end points x0 and x1 in the horizontal direction from the position of the subject x and the length L_HOL in the horizontal direction. Also, the microprocessor calculates the equation:

$$y0=y-L\_VER/2,\ y1=y+L\_VER/2 \quad (12)$$

regarding both of end points y0 and y1 in the vertical direction from the position of the subject y and the length L_VER in the vertical direction. Therefore, the frame data of four corner (x0, y0), (x0, y1), (x1, y0), (x1, y1) of the subject are output.

While, if losing sight of the subject, the microprocessor proceeds from step SP16-2 to step SP16-4 to output the outside position of the screen as the frame position or output the position of for corner as the frame position so that the frame W becomes one point.

At step SP62, the frame given by the frame position is displayed superimposingly on the screen, so that the size and the position of the subject, and the frame W which always surrounds the neighboring of the subject regardless of the movement of the subject.

(5-3) Effects

According to the above construction, R-Y signal and B-Y signal of the subject are modeled to the quadratic function Fr(Y) and Fb(Y) represented by the luminance Y respectively, the shape of the subject is detected from the feature plane PC(i,j) in which the permissible error limits for the quadratic function is obtained as the permissible error model Hr(Y), Lr(Y), and Hb(Y), Lb(Y), and the frame W having the size in accordance with the area and the position of the subject is generated based on the detected result. Therefore, the subject tracking apparatus which have the function capable of surrounding the neighboring of the subject by the frame W always can be realized.

(6) Other Embodiments

The embodiments discussed above have dealt with the case where the color signal estimation function is modeled by the quadratic function represented by the luminance Y to detect the position of the subject by using the feature plane PC(i,j) obtained by the permissible error model Hr(Y), Lr(Y) obtained by the quadratic function. However, this invention is not limit to this, but the average value of the luminance in vicinity of the position of which supposed to be a subject can be calculated every time, and iris can be controlled so that the average value of the luminance is constant. The subject tracking apparatus which has the auto-iris function by using such method can be realized.

Further, the subject tracking apparatus having auto-focus function can be realized, in which the frequency components of the luminance in vicinity of the position of subject is detected to use focus controlling.

Further, the function for controlling a posture so that the detected position of the subject is constantly in the center of the screen is applicable to the correction of camera shake.

Further, the embodiments discussed above have dealt with the case where the subject in the screen is tracked. However, this invention is not limit to this, but the position of user's hand or face in the screen is tracked, to that the pointing device such like a mouse in a game machine, a computer, or the like can be realized.

Further, the embodiments discussed above have dealt with the case where the target is tracked based on the color video signal TV1 input from the imaging device 2. However, this invention is not only limit to this, but the video signal or the like reproduced by a video tape recorder, a computer, or a game machine can be regarded as the input signal to track the target set in the video signal.

Further, the embodiments discussed above have dealt with the case of the basic system of the subject tracking apparatus. However, this invention is not only limit to this, but the subject tracking apparatus according to this invention is applicable to a videophone system or a security system. Also, this invention is applicable to the case where the subject of target is tracked by a television camera such like a multimedia system.

Further, the embodiments discussed above have dealt with the case where the quadratic function is used as the color signal estimation function. However, this invention is not only limit to this, but the color can be estimated by other functions such as linear function, exponential function, logarithmic function, trigonometric function, and elliptic function.

Further, the embodiments discussed above have dealt with the case where the color area is expanded one-dimensionally. However, this invention is not only limit to this, but is applicable to the method for expanding two-dimensionally.

Further, the embodiments discussed above have dealt with the case where the zoom lens 12 is controlled by using the area of subject obtained by the area calculating processing. However, this invention is not only limit to this, but is applicable to the camera control such as iris-control/focus-control of subject extraction type.

Further, this invention is also applicable a toy which moves forward and backward in accordance with the increasing/decreasing of the area, and an image encoding apparatus which performs the adaptive quantization allocating more amount of information than the amount of information in other area to the amount of information in the area.

Further, the embodiments discussed above have dealt with the case where the area is calculated based on the position and the distance of the subject. However, this invention is not only limit to this, but the area can be obtained by calculating the number of points having the same color as the subject in the area.

Also, the embodiments discussed above have dealt with the case where the frame W is generated in the frame image synthesizing unit 22, and display it on the screen. However, this invention is not only limit to this, but can be used for the display of character or the painting over the whole area.

Furthermore, the embodiments discussed above have dealt with the case where the frame is not displayed if the subject does not exist. However, this invention is not only limit to this, but the frame W which is different in the type from that when surrounding the subject can be displayed, and character can be also displayed. Moreover, the processing is applicable to the switching of color which has been displayed.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A subject tracking apparatus comprising:

a color estimation function determining means for judging the hue of a target from a first and second color difference signal contained in the target area among an input color video signal, and for modeling each of said first and second color difference signal by a color estimation function having the luminance of said input color video signal as a variable, in accordance with said hue;

permissible error model determining means for calculating a permissible error model with respect to each of a first color estimation function corresponding to said first color difference signal and a second color estimation function corresponding to said second color difference signal;

color information judging means for comparing the permissible error model which are respectively calculated with respect to said first and second color estimation function to said input color video signal, to extract the area which conforms to said permissible error model;

feature plane setting means for calculating the reference feature plane representing said target based on the pixel value of the area extracted by said color information judging means among the target areas; and position determining means for extracting the area which conforms to said permissible error model by comparing said permissible error model to the input color video signal input after setting said reference feature plane to obtain the feature plane with respect to said input color video signal, and for determining the position where the correlation between said feature plane and said reference feature plane becomes maximum as the position where the target exists.

2. The subject tracking apparatus according to claim 1, comprising area expanding means for re-evaluating the pixel value adjacent to the area extracted as the area which conforms to said permissible error model by said color judging means, and for increasing the area which conforms to said permissible error model.

3. The subject tracking apparatus according to claim 1, wherein said position determining means extracts the area which conforms to said permissible error model with respect to only the specific area out of the whole area by comparing said permissible error model to the input color video signal input after setting said reference feature plane, and obtains the feature plane of said input color video signal only in said specific area.

4. The subject tracking apparatus according to claim 1, comprising transmitting means for transmitting the position of said target determined by said position determining means as the position input for peripheral equipments.

5. The subject tracking apparatus according to claim 1, comprising control means for controlling peripheral equipments based on the position of said target determined by said position detecting means.

6. The subject tracking apparatus according to claim 1, comprising size detecting means for detecting the size of said target on a screen from the position of said target determined said position determining means and the distribution of pixel value on said feature plane.

7. The subject tracking apparatus according to claim 6, comprising sub-image generating means for generating a sub-image having the size in accordance with the size of said target, based on the position on a screen of said target obtained by said position determining means and the size of said target obtained by said size detecting means.

8. A subject tracking apparatus comprising:

an imaging device for imaging a target;

a color estimation function determining means for judging the hue of the target from a first and second color difference signal contained in the target area among the input color video signal input by said imagining device, and for modeling each of said first and second color difference signal by a color estimation function having the luminance of said input color video signal as a variable, in accordance with said hue;

permissible error model determining means for calculating a permissible error model with respect to each of a first color estimation function corresponding to said first color difference signal and a second color estimation function corresponding to said second color difference signal;

color information judging means for comparing the permissible error model which are respectively calculated with respect to said first and second color estimation function to said input color video signal, to extract the area which conforms to said permissible error model;

feature plane setting means for calculating the reference feature plane representing said target based on the pixel value of the area extracted by said color information judging means among the target areas;

position determining means for extracting the area which conforms to said permissible error model with respect to the whole area by comparing said permissible error model to the input color video signal input after setting said reference feature plane to obtain the feature plane with respect to said input color video signal, and for determining the position where the correlation between said feature plane and said reference feature plane becomes maximum as the position where the target exists; and driving means for driving said imagining device based on the detected result of said position determining means, and for turning the photographing direction of said imaging device toward the direction that said target is positioned.

* * * * *